O. SEIFERT & J. W. MANGER.
Combined Spice-Box and Grinder.
No. 197,982. Patented Dec. 11, 1877.
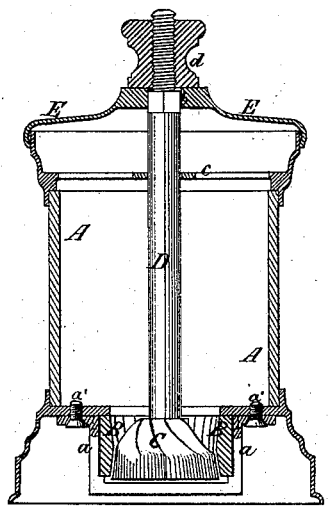
Witnesses:
Carl Steinmetz
Gustav Flemming
Inventors:
Oscar Seifert
Julius W. Manger

UNITED STATES PATENT OFFICE.

OSCAR SEIFERT AND JULIUS W. MANGER, OF NEWARK, NEW JERSEY.

IMPROVEMENT IN COMBINED SPICE BOX AND GRINDER.

Specification forming part of Letters Patent No. 197,982, dated December 11, 1877; application filed June 2, 1876.

*To all whom it may concern:*

Be it known that we, OSCAR SEIFERT and JULIUS W. MANGER, both of the city of Newark, State of New Jersey, have invented an Improved Spice Box and Grinder Combined, of which the following is a specification:

The object of our invention is to construct spice-boxes with grinders attached to them, wherein spices in an unground state can be kept, and be used in the kitchen or on the table freshly ground, in quantities required.

Spices not ground being cheaper and far better when ground fresh, can be kept whole in said boxes, and be ground for use whenever required, by simply operating the grinder attached to the bottom of the box.

The accompanying drawing (a sectional view) illustrates our invention in all its details.

A is a box, which can be made in any shape and out of any material whatever, so that it can be used either in the kitchen or on the table. To the bottom of said box a grinder is attached, which consists of the fixed part B, which is secured to the outside of the bottom by means of a bracket, $a$, and screws $a'$, or otherwise, and the rotating cone C, all properly dressed. Said cone C is provided with a stem, D, that passes upward in the middle of the box, and through the cover of the latter. The upper portion of the stem D is made with a screw-thread to receive a nut, $d$.

E is the cover of the box A, made to turn freely on said box, and formed with a central opening, $b$, to fit that portion of the stem D which passes through it, in such a manner that when the cover E is turned the stem D and cone C will turn with it. The nut $d$ serves to hold down the cover E, as well as to regulate the cone C in grinding the spices more or less fine. The brace $c$ serves as a bearing for the stem D.

In constructing the boxes we prefer to have the body of the boxes made of glass, so that the contents can be easily seen.

It will be evident that by turning the cover E any required quantity of freshly-ground spices can be produced for immediate use with ease, thus being sure of having unadulterated spices, and at less cost than if bought already ground.

It will be observed from the above description that our invention relates to portable hand spice-boxes, which are adapted for use on the table, and which are susceptible of being highly ornamented for such use. The device is not designed for grinding coffee. It is especially useful for table-spices requiring grinding, and which it is desirable always to inspect before using, on account of a common fraud of adulteration; hence we make the body transparent.

We have invented a portable or hand box or caster, which we believe to be a new, improved, and useful article of manufacture.

We claim as our invention—

The combination, in a spice box and grinder, of the rotating cover E, which drives the stem D, having the cone C, and the box-body A, having the fixed grinding-shell B, as and for the purpose substantially as described.

OSCAR SEIFERT.
JULIUS W. MANGER.

Witnesses:
C. STEINMETZ,
GUSTAV HENNING.